United States Patent [19]

Reed et al.

[11] 4,080,644

[45] Mar. 21, 1978

[54] REJECTION DEVICE FOR OUTDOOR METER PEDESTAL SYSTEMS

[75] Inventors: Ronald H. Reed, Versailles; Michael R. Harris, Winchester, both of Ky.

[73] Assignee: Square D Company, Park Ridge, Ill.

[21] Appl. No.: 748,627

[22] Filed: Dec. 8, 1976

[51] Int. Cl.² .......................... H02B 1/16; H02B 1/10
[52] U.S. Cl. ..................................... 361/363; 174/51; 361/358; 361/364
[58] Field of Search .................. 174/51; 361/358–364, 361/366, 372

[56] References Cited

U.S. PATENT DOCUMENTS

| | | | |
|---|---|---|---|
| 3,450,951 | 6/1969 | Boyle | 361/369 |
| 3,585,456 | 6/1971 | Phillips, Jr. | 174/51 |
| 3,753,047 | 8/1973 | Shallbetter | 361/372 |
| 3,987,344 | 10/1976 | Ambruoso, Sr. | 174/51 |

*Primary Examiner*—Gerald P. Tolin
*Attorney, Agent, or Firm*—Richard T. Guttman; Michael J. Femal

[57] ABSTRACT

An apparatus for rejecting an improperly installed plug-on unit, including a circuit controlling device, in an electric power distribution and metering system having a box-like enclosure. A pair of supports are attached to opposing sides within the enclosure with top surfaces substantially parallel to the back of the enclosure so that the plug-on unit can be secured thereto. The circuit controlling device includes a circuit breaker with plug-on jaws, a receptacle and a neutral connector at one end of the plug-on unit which plugs into a jaw of a ground assembly on the back of the enclosure. A plurality of U-shaped interference brackets are welded across the width of the enclosure above the top surface of one support where the end of the plug-on unit containing the neutral connector must be mounted. Each bracket includes a 30° angle on the outermost end of the bracket which slopes inwardly toward the side of the enclosure in direction from top to bottom of the bracket so that the mounting of the plug-on units can only be accomplished in one manner. This manner requires the neutral connector end of the plug-on unit to be inserted at approximately the 30° angle of the brackets onto the top surface of the one support and then pivoted until the breaker jaws mount on the bus bar and the other end of the plug-on unit rests upon the top surface of the other support. Therefore, the neutral connector which is on the pivoted end of the plug-on unit, is plugged into the jaw of the ground assembly a predetermined distance prior to the circuit being energized.

5 Claims, 5 Drawing Figures

REJECTION DEVICE FOR OUTDOOR METER PEDESTAL SYSTEMS

BACKGROUND OF THE INVENTION

This invention relates to an electric power distribution and metering system within a box-like enclosure and more particularly to an apparatus for rejecting improperly installed plug-on units, containing circuit controlling devices, in the enclosure.

There is a trend for electrical codes and certification laboratories for electrical equipment to require that power distribution panels designed for use outdoors such as in mobile home parks, marinas, parking lots and the like with interchangeable plug-on units have a means to assure grounding prior to the live contacts being energized.

The closest prior art believed to be pertinent to the present invention is set forth in the Shallbetter U.S. Pat. No. 3,753,047 and the Boyle U.S. Pat. No. 3,450,951 both of which disclose an outdoor electrical meter box and service outlet to be mounted on a hollow post or the like through which electrical power lines may pass into the meter distribution panel. However, neither patent discloses a means for insuring a ground connection on a plug-on unit before its circuit is energized. A serious drawback to this type of an electrical power distribution and metering system is that the plug-on unit may not be grounded before the live contacts of the circuit are energized and thus create a potential shock hazard.

SUMMARY OF THE INVENTION

With this invention, the foregoing problems are substantially solved. The box-like enclosure for receiving the plug-on units of the power distribution and metering system has a rejection feature which permits the mounting of the plug-on unit to be accomplished only in one manner and that manner assures that the ground connection is made before the live contacts are energized. This rejection feature is accomplished by welding interference brackets across the width of the enclosure directly above the support bracket where the end of the plug-on unit, containing the grounding contact, must be mounted. The design of these interference brackets includes an outermost end pitched at a 30° angle with respect to the top surface of the support bracket so that end of the plug-on unit with the ground contact must be inserted at approximately the 30° angle of the interference brackets onto the support bracket and then the plug-on unit is pivoted until the conductive circuit breaker jaw mounts on the terminal connector of the bus bar and the other end of the plug-on units rests on the opposing support bracket on the other side of the enclosure. Since the ground connection is on the pivot end of the plug-on unit, it is plugged into the jaw of the ground assembly, which is mounted on the back of the enclosure, the required distance prior to the circuit being energized.

Accordingly, the principal object of the present invention is to provide a rejection feature for an outdoor electrical power distribution and metering system that restricts the insertion of plug-on units with circuit controlling devices if an attempt is made to improperly install the plug-on unit such as an attempt to energize the circuit controlling device before the ground connection is made by requiring that the plug-on unit be mounted in only one manner.

Another object of the present invention is to provide a rejection feature for an outdoor electrical power distribution metering system which mechanically requires the ground connection to be made before the circuit is energized and which cannot be removed or circumvented by an unauthorized person without materially modifying the panelboard to prevent a possible shock hazard to unauthorized or authorized persons.

An apparatus for rejecting an attempt to improperly install a plug-on unit within the enclosure of a power outlet panel of an outdoor meter pedestal system in accordance with this invention comprises a pair of opposing supports for fixedly securing the plug-on unit within the enclosure. A plurality of U-shaped interference brackets are welded across the width of the enclosure in a spaced relation above the top surface of one of the supports. The interference brackets are designed to include a 30° angle side with respect to the top surface of the one support so that a plug-on unit must be inserted at approximately the 30° angle of the brackets and then pivoted until the conductive circuit breaker jaw mounts on the terminal connector of the bus bar. A neutral connector is mounted on the pivot end of the plug-on unit and a complimentary ground jaw is mounted on the back of the box enclosure so that a ground connection is made prior to the circuit breaker electrically engaging the bus bar and thereby energizing the circuit. This rejection feature precludes the improper installation of plug-on units by unauthorized or authorized personnel since the interference brackets are of steel and are welded to the side of the enclosure above the top surface of the one support thus preventing circumvention by tools ordinarily carried by qualified electricians or by other personnel.

Other objects and advantages will become apparent from the description wherein the reference is made to the accompanying drawings illustrating the preferred embodiments of the invention, and in which.

DESCRIPTION OF THE PREFERRED EMBODIMENT

Figure 1:
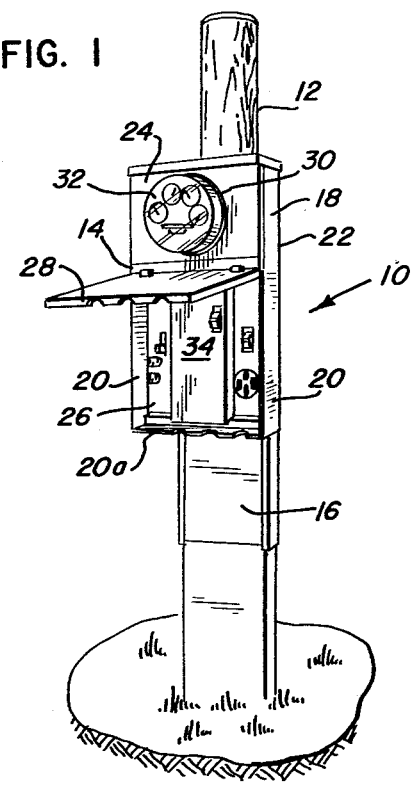
FIG. 1 is a perspective view of an outdoor meter pedestal system incorporating the rejection feature in accordance with this invention.

One embodiment of a rejection device for a meter pedestal system with interchangeable plug-on units made according to the invention is illustrated in the drawings.

Referring to FIG. 1 of the drawings, an outdoor meter pedestal system 10 for distribution of power to individual lots of mobile home parks and the like is shown secured to a post 12. The meter pedestal system 10 includes a power outlet panel 14 and a pedestal base channel 16 for connecting the power outlet panel 14 to an electrical source (not shown). The power outlet panel 14 comprises a rectangular metal enclosure 18 having side walls 20, and a back wall 22 and a trim front member 24. The trim front member 24 has a frontal opening 26 to provide access to the interior of the enclosure 18. The opening 26 is also provided with a door 28 and the trim member 24 further includes a meter socket opening 30 above the door 28 for mounting a meter 32 therein. A plurality of different interchangeable plug-on units 34 are mounted within the interior of the enclosure 18 through the frontal opening 26.

As shown in FIGS. 2a-4, within the enclosure 18 is an interior assembly 36 which is secured, by any suitable means, to the back wall 22 of the enclosure 18 and mechanically supports several parallel rows of circuit controlling devices such as circuit breakers which are affixed to the plug-on units 34. The plug-on units 34 comprise a longitudinal rectangular panel 38, a circuit breaker 40, a receptacle 42 and a neutral ground connector 44. The neutral ground connector 44 is mounted near one end of panel 38 which has an angled end portion 46.

Interior assembly 36 comprises a pan 48, the side edges of which are folded upwardly to form a pair of spaced parallel upstanding flanges 50 and 52. The flanges 50 and 52 are provided with rolled-over bead portions 54 and 56, respectively, and function as elements of a mounting system for the circuit breakers 40 on the plug-on units 34.

A pair of longitudinally extending bus bars 58 and 60 are mounted in spaced parallel relationship with respect to each other upon an insulating support 62 carried by the pan 48. A plurality of terminal connectors 64, each electrically and mechanically connected to one of the bus bars 58 and 60 in alternate arrangement lengthwise of the panel 14, extend transversely from their associated bus bar toward the other to define longitudinally spaced mounting areas for the circuit breakers 40 and provide for electrical connection of each of the circuit breakers to one of the bus bars 58 and 60. The circuit breaker 40, and each of the other circuit breakers on the other plug-on units, are provided with an identical conductive spring jaw clip 66 that extends downwardly from the base of the circuit breaker for making electrical connection to the connectors 64. Each circuit breaker also includes a spring jaw mounting clip 68 that accepts the rolled-over bead portion 54 or 56 in a clamping engagement. Because the mounting clip 68 carries no current, it is preferably made from high strength spring steel. Interengagement of the mounting clip 68 with the bead portion 54 on the pan 48 in cooperation with the conductive clip 66 mechanically supports the circuit breaker 40 on each plug-on unit with respect to the interior assembly 36. Further structural details of the interior assembly 36 are more fully disclosed in U.S. Pat. No. 3,105,175 by Ralph H. Kingdon and assigned to the assignee of the present invention.

Figure 4:
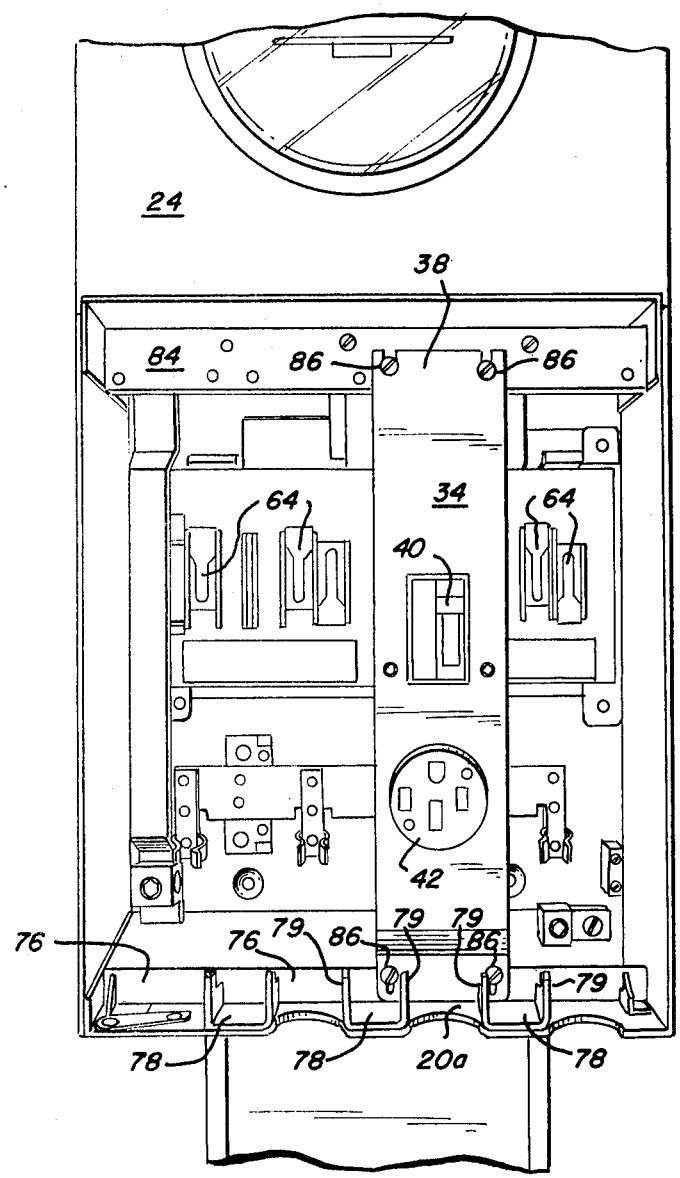
FIG. 4 is a front view of a portion of the pedestal of FIG. 1 taken from the right of FIG. 2b.

In accordance with the present invention, a ground assembly 70 is mounted on the back wall 22 of the power outlet panel 14 closely adjacent one of the sidewalls 20a. The ground assembly 70 includes a spring clip jaw 72 extending outwardly to engage the neutral ground connector 44 on the plug-on unit 34. The sidewall 20a adjacent to the ground assembly 70 includes a support 74 in the shape of an L having a top surface 76 parallel to the back wall 22 and to the trim front member 24 for mounting the rectangular panel 38 of the plug-on unit 34 thereto. Spaced at least the thickness of the panel 38 above top surface 76 of support 74 are a plurality of U-shaped interference brackets 78 welded to side wall 20a in spaced relation across the width of the enclosure 18. The U-shaped brackets 78 are spaced apart a predetermined distance from one another so that at least one leg 79 of two or more brackets 78 overlaps the rectangular panel 38 of a properly installed plug-on unit 34 as shown in FIG. 4. The outermost end 80 on each leg of the U-shaped brackets 78 slopes inwardly toward the sidewall 20a in a direction of the top surface 76 of support 74. One of the slopes of the outermost end 80 of interference bracket 78 immediately above the top surface 76 of the support 74 is approximately 30° with respect to the top surface 76 and acts as a guide for inserting the plug-on unit 34 through the frontal opening 26 into the metal enclosure 18 for mounting.

On the opposing side of the enclosure opening 26 from support 74 is a support 82 connected to trim front member 24 and extending downwardly therefrom into the enclosure. The support 82 has a top surface 84 similar to top surface 76 for mounting the other end of the plug-on unit 34 thereto by means of screws 86 or the like. The support 82 extends across the width of the enclosure parallel to support 74 as shown in FIG. 4.

Figure 2A:
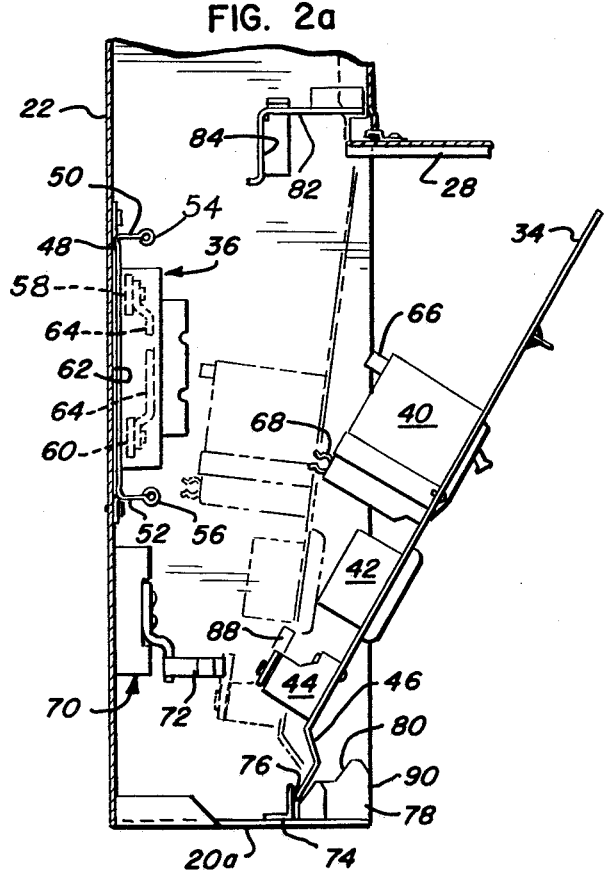
FIG. 2a is a partially sectioned side view of a portion of the pedestal of FIG. 1, illustrating the proper insertion of a plug-on unit.
Figure 3:
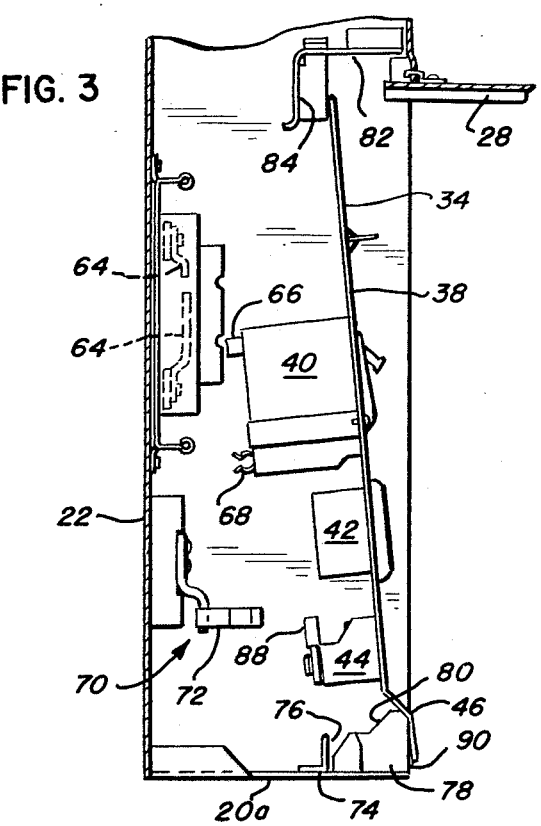
FIG. 3 is a view similar to FIG. 2a, illustrating the improper installation of the plug-on unit and the rejection thereof.
Figure 2B:
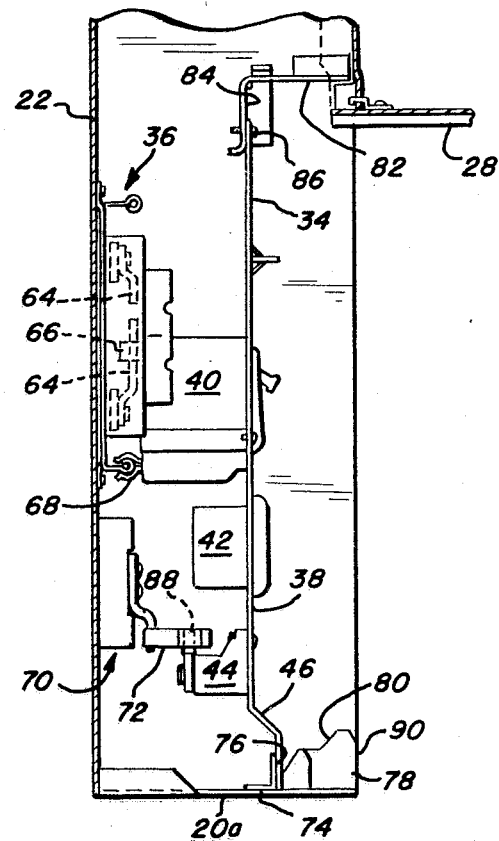
FIG. 2b is a view similar to FIG. 2a, illustrating the plug-on unit fully inserted.

When it is desired to mount a plug-on unit 34 within the metal enclosure 18, the door 28 is pivoted to its fully open position as shown in FIGS. 2a-3, and the angled end portion 46 of panel 38 of plug-on unit 34 having the neutral ground connector 44 is inserted first into the enclosure at approximately the 30° angle of bracket 78 with respect to the top surface 76 of support 74 with the 30+ slope of the outermost end 80 of the interference bracket 78 serving as a guide to insertion. With the angled end portion 46 of plug-on unit 34 resting upon the top surface 76 of the support 74, the plug-on unit 34 is then pivoted downwardly onto the top surface 84 of support 82. As can be seen in FIG. 2a, when the plug-on unit 34 is pivoted downwardly after properly inserting the angled end portion 46 first, mating members 88 and 72 of the ground connection will engage prior to spring jaw clips 66 and 68 engaging the terminal connector of the bus bar and the rolled-over bead portion 54 and 56 of the pan 48, respectively. Therefore, the ground connection of the circuit controlling device on the plug-on unit 34 is always made prior to the circuit controlling device being energized thereby to reduce the shock hazard during installation of the plug-on units.

Turning now to FIG. 3, it can be seen if an inexperienced or unauthorized person attempts to improperly install a plug-on unit 34 within the metal enclosure 18 by inserting the other end of the plug-on unit onto the top surface 84 of support 82 first, then the angled end portion 46 will engage the upper portion 90 of the interference bracket 78 preventing the plug-on unit 34 from pivoting downwardly onto top surface 76 of support 74. In this position, the conductive spring clip jaw 66 on circuit breaker 40 will not make contact with the terminal connector 64 of either bus bar 58 or 60 and the circuit is prevented from being energized.

In summary, the rejection device of the present invention provides a safe means for installing a plug-on unit within an outdoor power outlet panel. The design of the rejection device eliminates any possibility that a person, not having the skill requisite to realize the possible shock hazard if the plug-on unit is improperly installed without first making the ground connection, will be able to insert the plug-on unit improperly within the power outlet panel 14 since the interference bracket 78 above the support 74 will mechanically reject such an attempt to mount the plug-on unit. Interference between the angled end portion 46 of the plug-on unit 34 and the upper portion 90 of the interference bracket 78 also positively prevents engagement of the conductive spring jaw 66 with the terminal connector 64 of either bus bar 58 or 60. Therefore, the circuit breaker 40 cannot be mechanically engaged with the interior assembly 36 which prevents mounting of the plug-on unit within the power outlet panel 14 unless the angled end portion 46 of the plug-on unit is inserted first at the required 30° angle and then the plug-on unit 34 is pivoted into place on the other support ensuring the proper ground connection before the circuit controlling device is energized.

We Claim:

1. In an outdoor meter pedestal system with a plug-on unit, having a panel, circuit controlling device mounted on the panel, and a neutral connector mounted at one end and on the back side of the panel in circuit with the circuit controlling device, the meter pedestal system comprising a box enclosure, a support assembly and a neutral jaw within the enclosure for mechanically supporting the circuit controlling device and for grounding the neutral connector respectively, and means for connecting the circuit controlling device in its mounted position to an external source of electrical energy, the improvement comprising a rejection device comprising:

a pair of supports mounted on opposing sides of the enclosure supporting the panel of the plug-on unit within the enclosure so that the circuit controlling device is in connection with the support assembly and the neutral connector is in connection with the neutral jaw, and an interference bracket mounted on one side of the enclosure in a spaced relation above one the supports nearest the neutral jaw so that the one end of the panel with the neutral connector must be inserted at an angle with respect to the panel supporting surface of the one support and then the other end of the panel pivoted into connection with the other support wherein the neutral connector on the pivot end of the panel is plugged into the neutral jaw a predetermined distance prior to the circuit controlling device connection with the support assembly and connecting means for energizing the device.

2. An apparatus for rejecting an improperly installed plug-on unit with a circuit controlling device in an outdoor electric power distribution and metering system having a box-like enclosure, comprising:

a pair of supports attached to opposing sides within the enclosure, each having a top surface substantially parallel to the back of the enclosure fixedly securing the ends of the plug-on unit thereto, said unit containing said circuit controlling device, means, operatively engaging the circuit controlling device, for energizing the device, means, electrically connected to the device at one end of the plug-on unit and to the enclosure at a point adjacent one of the supports for grounding the device, said ground means having mating members; and means, cooperating with the one support and attached to the same side of the enclosure as the one support and located immediately above the top surface thereof in a spaced relation, for rejecting the insertion of the plug-on unit unless the one end of the plug-on unit is inserted first at an angle to the top surface of said one support and within the space between the rejecting means and top surface of said one support wherein the other end of the plug-on unit is pivoted onto the top surface of the other support causing the mating members of the grounding means to engage a predetermined distance ahead of the device being energized by the energizing means.

3. The apparatus of claim 2 in which the plug-on unit comprises a substantially rectangular trim panel with the circuit controlling device including a circuit breaker, a receptacle and a neutral connector, the ends of said trim panel are fixedly secured by screws or the like to the front surfaces of the supports so that the trim panel is substantially parallel to the back of the enclosure in its mounted position within the enclosure.

4. The apparatus of claim 2 in which the mating member of the grounding means are a neutral connector on the plug-on unit and a grounding jaw in alignment with the neutral connector mounted on the back of the enclosure, the neutral connector being on the pivot end of the plug-on unit so that the neutral connector is plugged into the jaw prior to the energizing means engaging the circuit controlling device.

5. The apparatus of claim 2 in which the rejecting means are U-shaped interference brackets welded across the width of the enclosure where the end of the plug-on unit containing the ground means must be mounted to the one support, said brackets including approximately a 30° angled side with respect to the front surface of the support so that the plug-on units must be inserted at approximately the 30° angle of the brackets into the enclosure and then pivoted until the circuit controlling device engages the energizing means.

* * * * *